United States Patent
Kanemura

(10) Patent No.: US 6,461,071 B1
(45) Date of Patent: Oct. 8, 2002

(54) AUXILIARY TOOL FOR CABLE HAULING

(76) Inventor: Takayasu Kanemura, 423-1, Fumoto, Shinbeppu-cho, Miyazaki-shi, 880-0834 (JP)

( * ) Notice: Subject to any disclaimer, the term of this patent is extended or adjusted under 35 U.S.C. 154(b) by 0 days.

(21) Appl. No.: 09/555,722

(22) PCT Filed: Jun. 16, 1998

(86) PCT No.: PCT/JP98/02665
§ 371 (c)(1),
(2), (4) Date: Jul. 26, 2000

(87) PCT Pub. No.: WO99/28650
PCT Pub. Date: Jun. 10, 1999

(30) Foreign Application Priority Data

Dec. 4, 1997 (JP) ............................................. 9-367501

(51) Int. Cl.$^7$ ................................................. F16B 1/12
(52) U.S. Cl. ............................. 403/24; 403/78; 403/164
(58) Field of Search ............................. 403/24, 78, 164, 403/165, 209; 24/115 K, 115 R, 125

(56) References Cited

U.S. PATENT DOCUMENTS

| | | | | |
|---|---|---|---|---|
| 2,214,961 A | * | 9/1940 | Hawley | 403/209 X |
| 2,772,902 A | * | 12/1956 | Lind | 403/165 |
| 2,946,619 A | * | 7/1960 | Wahl | 403/209 X |
| 3,346,284 A | * | 10/1967 | Petersen et al. | 403/78 |
| 3,490,799 A | * | 1/1970 | Shreeve | 403/3 |
| 3,500,508 A | * | 3/1970 | Bennett | 24/115 R |
| 4,195,798 A | * | 4/1980 | Costantino et al. | 403/78 X |
| 5,024,548 A | * | 6/1991 | Timmington | 403/78 |

FOREIGN PATENT DOCUMENTS

| | | | |
|---|---|---|---|
| JP | 52-152943 U | 11/1977 | F16G/11/09 |
| JP | 02-48903 U | 5/1990 | G02B/6/00 |
| JP | 06-16911 U | 4/1994 | G02B/6/00 |
| JP | 06-98452 A | 4/1994 | H02G/15/02 |
| JP | 09-217795 A | 8/1997 | F16G/11/12 |

* cited by examiner

Primary Examiner—Lynne H. Browne
Assistant Examiner—John R. Cottingham
(74) Attorney, Agent, or Firm—Sheridan Ross P.C.

(57) ABSTRACT

An auxiliary tool for cable hauling capable of restraining a tip end of a cable, which is exposed due to cutting on a cable laying site, with a restraint force enough to withstand a hauling force, and being applied even on a laying site where pipe size is small. A tension member (51) is exposed and is inserted into and received in a tip end receiving section (2a) and further is inserted through one of insertion holes (41) of a restraint member (4) and held back to be inserted through an other insertion hole (41). The tension member (51) thus held back is held on itself to be subjected to clamping with a first clamping member (42b). The tip end receiving section (2a) and a connection section (2b) are screw-engaged with each other in a state in which the restraint member (4) is received in the tool.

4 Claims, 7 Drawing Sheets

AUXILIARY TOOL FOR CABLE HAULING

FIELD OF THE INVENTION

This invention is related to an auxiliary tool for cable hauling which is used to link a cable tip end with a hauling means at a laying site of communication cable such as an optical fiber cable or other cable such as an electrical wire.

BACKGROUND OF THE INVENTION

The demand for communication network construction has increased steadily with multimedia development in recent years. Especially, in communication networks such as CATV and intranets, optical fiber cables are generally used because their capacity and communication speed are excellent.

As shown in FIG. 8, a tension member 51 of an optical fiber cable 5 is connected to a connecting tool 7 for cable hauling. Connecting tool 7 is linked with hauling means such as a winch, and then optical fiber cable 5 is hauled at a laying site thereof. When the tension member 51 is connected to the connecting tool 7, a tip end of the tension member 51 is inserted into a tip end insertion hole 71, and restraint portion 72 is clamped using specialized equipment, thereby restraining the tip end of the optical fiber cable 5. The restraint portion 72 has such a small diameter that it has to be clamped by specialized equipment under high pressure. As a result, the tip end of tension member 51 will not disconnect from connecting tool 7, even if it is hauled with a traction of approximately 800 Kgf.

However, the above-described specialized clamping equipment cannot be used at the laying site of the cable. A cable that is cut at the laying site cannot be connected to the connecting tool. A tip end of the cable, which is exposed by cutting, will be difficult to link to a hauling means with sufficient restraint force.

In the case of delivered cable that has already been connected to a connecting tool by clamping with specialized equipment, such connecting tool may not be suitable for use at certain laying sites because of the diameter of its laying tube. If unable to be used, the connecting tool will have to be cut off from the cable tip end.

Further, this connecting tool is too long to turn in a 90° bend of the laying tube, which is turning up from a horizontal tube to a vertical tube.

The object of the present invention is to solve the above mentioned problems. The invention provides an auxiliary tool for cable hauling capable of constraining a cable tip end which is exposed due to cutting off at a cable laying site, with sufficient restraint force to withstand a hauling force, and can be used even at a laying site where the pipe diameter size is small.

SUMMARY OF THE INVENTION

In the present invention, an auxiliary tool for cable hauling is provided which links a cable tip end with a hauling means to haul said cable for laying comprising: a container containing a cable tip end; a linkage interconnected with said hauling means, said linkage being connected to said container; a restraint means restraining said cable tip end; wherein said restraint means is contained and held in said container in such a manner that said restraint means restrains said cable tip end. Since neither the cable tip end nor the restraint means thereof is exposed, both are out of contact with the inner wall of the laying tube. Furthermore, problems such as hooking or breaking off will not occur. The cable tip end is linked with the hauling means by a linkage tool, providing a reliable and strong linkage.

Further, an auxiliary tool for cable hauling is provided which comprises: a container containing said cable tip end; a linkage interconnected with said hauling means, said linkage being connected to said container; a restraint means restraining said cable tip end; said container being divisible into a tip end container portion and a linking portion, said tip end container portion containing an inserted cable tip end, said linking portion being connected to a linkage. After a cable tip end is restrained by restraint means, it is installed in the container easily.

Furthermore, if a restraint member which is a different body from said container and is freely rotatable is used as the restraint means, it will efficiently prevent twists while cable hauling.

DETAILED DESCRIPTION OF THE INVENTION

The present invention provides an auxiliary tool which restrains the tip end of a cable to link with hauling equipment at a laying site of communication line, such as optical fiber cable or an electrical wire, passing through a pulley or laying tube.

The auxiliary tool for hauling comprises a container, a restraint means which is installed in the container, and a linking member which interconnects to hauling equipment. The container utilizes a compact design for smooth hauling in a narrow groove of a pulley or laying tube.

Preferably, a restraint member is used as a restraint means. The restraint member is freely rotatable around the axis along the cable tip end, and therefore, twisting of the cable while hauling thereof is eliminated. In most cases, when a linking portion which is interconnected with hauling equipment contacts the groove wall of a pulley or inner wall of a laying tube, the linking portion rotates. However, rotation of the linking portion does not convey to the restraint member. The restraint member restrains the tip end of the cable and is not stressed because it is freely rotatable as mentioned above. The cable is thereby prevented from separating during hauling.

Various types of restraint members may be used. For example, restraint members may have insertion spaces to insert a cable tip end, such as insertion holes or insertion hollows as described later. To achieve the object of the invention, restraint members of a variety of sizes are selected depending on the type of cable, and a suitable type of container for the selected restraint member is used. Cable can be installed utilizing a narrow existing laying tube having 20 mm diameter or less, up to a big sub-ground tube having a diameter of more than 500 mm.

Further, in addition to only one cable being hauled by one auxiliary tool, a plurality of cables, such as a combination of a communication cable and an electrical wire, are capable of being hauled simultaneously by one auxiliary tool if a proper restraint member is selected. Particularly, although the restraint portion could potentially be easily twisted because of unequal tension forces existing when a plurality of cables are hauled, an auxiliary tool can be used to eliminate this twist. As a result, the effect of the invention is more efficiently achieved.

Embodiment 1

In Embodiment 1, a restraint member restrains a cable tip end as a means of restraining a cable, and the restraint member is put in a container. Thereby, the cable tip end is restrained in the container.

Figure 1:
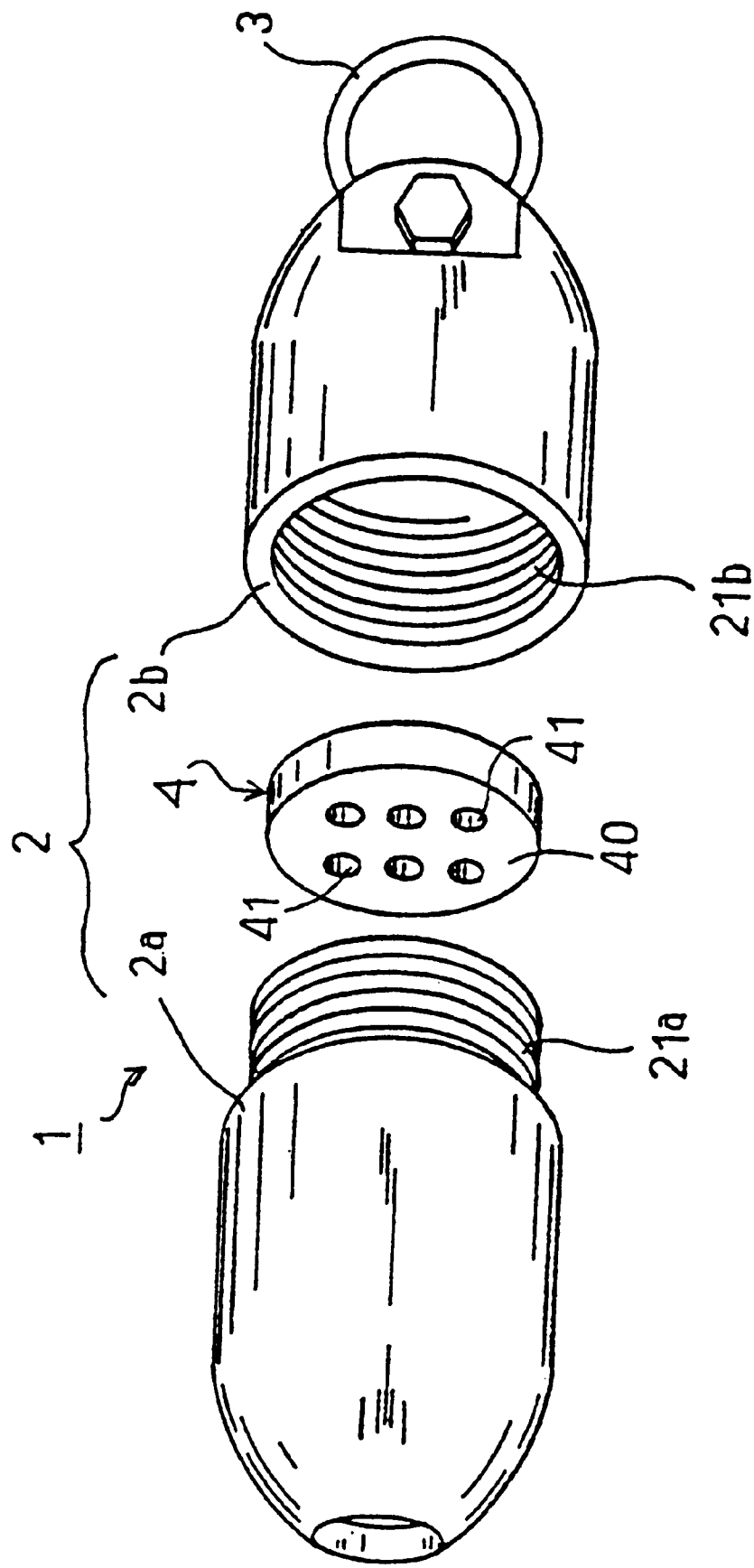
FIG. 1 is an exploded perspective illustration which shows the structure of an auxiliary tool for hauling cable of Embodiment 1.
Figure 2:
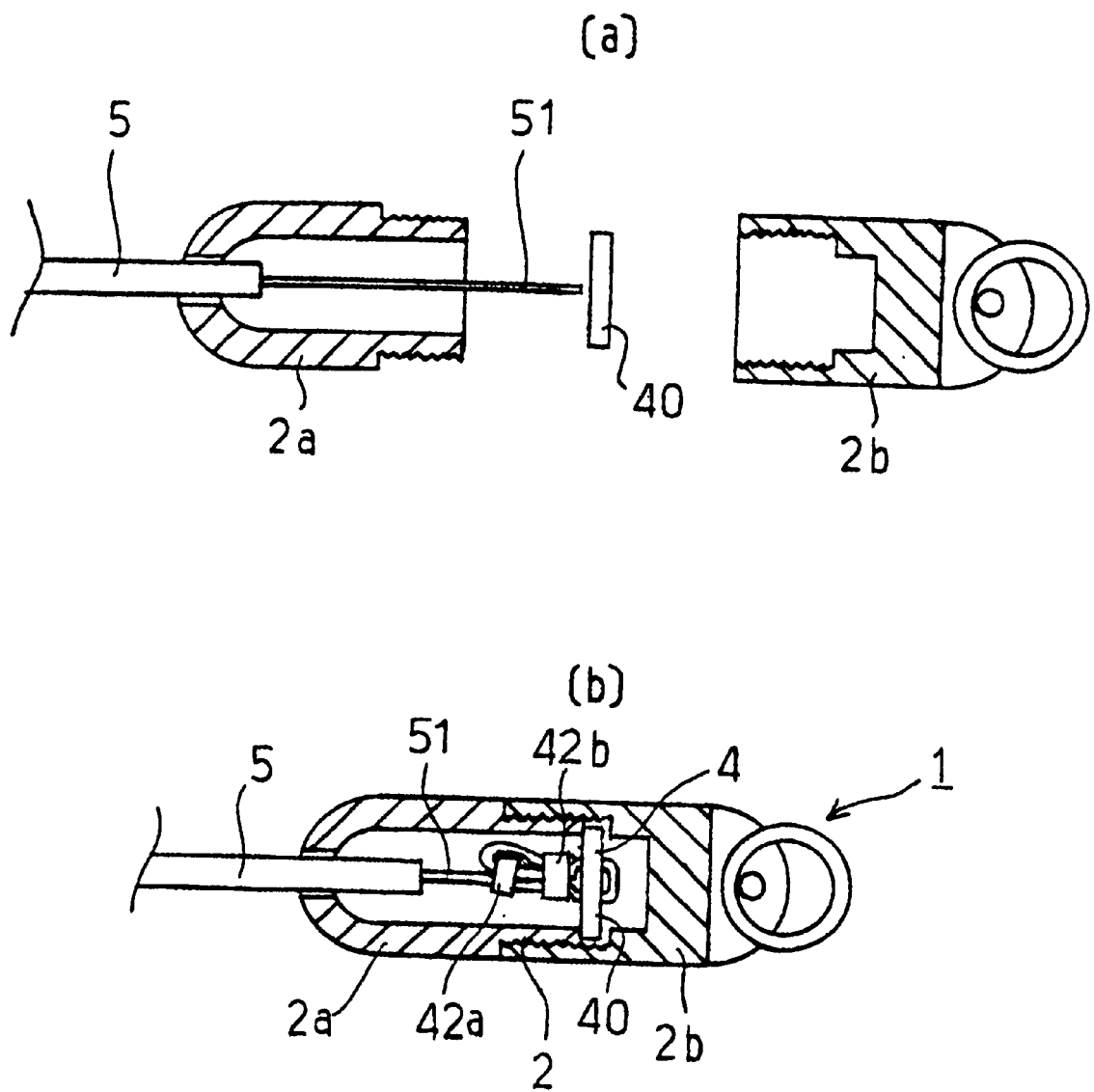
FIG. 2 is side sectional view which illustrates a condition of the cable tip end restrained by an auxiliary tool for hauling cable of Embodiment 1.

As shown in FIG. 1, an auxiliary tool 1 for hauling cable consists of container 2, a linkage 3 and a restraint member 4. The container 2 comprises a tip end container portion 2a, which cable tip end is inserted and stored therein, and a linking portion 2b, to which linkage 3 is joined. The linkage 3 is joined with container 2 and links with a hauling means. The restraint member 4 restrains a cable tip end and is installed in container 2. The tip end container portion 2a and the linking portion 2b are secured to each other by threads 21a and 21b. The restraint member 4 includes restraint metal fitting 40 and clamping members 42a and 42b (Refer FIG. 2). The restraint metal fitting 40 is held on the end of thread 21a when tip. end container portion 2a and linking portion 2b are secured to each other and tension is loaded on the cable tip end. The restraint metal fitting 40 is freely rotatable about an axis of the cable tip end.

The restraint metal fitting has six insertion holes 41. A cable tip end is inserted through the insertion holes 41 and is restrained by clamping of clamping members 42a and 42b as described below. Therefore, the restraint metal fitting 40 is installed in the container 2 after restraining the cable tip end, and then the cable tip end is restrained by the auxiliary tool 1.

The diameter of restraint metal fitting 40 is slightly smaller than the inner diameter of container 2 therearound. Therefore, the restraint metal fitting 40 is freely rotatable about an axis of the cable tip end in the container 2. Accordingly, even if the cable twists while hauling thereof, the twist will be eliminated by rotation of restraint metal fitting 40. The cable tip end restrained by the restraint metal fitting is not stressed and is prevented from wrenching off thereof.

An Example of Cable Hauling Using an Auxiliary Tool 1 of Embodiment 1.

In this example, an optical fiber cable is hauled. A tension member is a wick wire located within the optical fiber cable. The wick wire is used as a tension member by the auxiliary tool because tension cannot be applied to the optical fibers directly.

As shown in FIG. 2(a), a tension member 51 is exposed to haul the covered optical fiber cable 5. The tension member 51 is inserted through an insertion hole 41 and is bent back to be inserted through another insertion hole 41.

As shown in FIG. 2(b), tension member 51 is bent back,is inserted through another insertion hole 41, and then is restrained by restraint metal fitting 40. Since its restraint force is not enough for hauling thereof, it is clamped to be restrained. The tension member, which is turned back, is clamped with the first clamping member 42a. The tension member is bent back again and is clamped with the second clamping member 42b and is thereby strongly restrained by the restraint member 4.

Installing the restraint member 4 that restrains tension member 51, the tip end container portion 2a and the linking portion 2b are secured to each other. The tip end of optical fiber cable 5 is restrained by an auxiliary tool 1 and then it sufficiently withstands hauling.

The restraint forces of the restraint member of this invention, as well as the prior method using a clamping member only, are hereby compared.

A test wire is restrained by a clamping member which is used in the above Embodiment. Another test wire is restrained by restraint member of the Embodiment. These were hauled by a tension tester and the load was measured just before separation failure.

Incidentally, the strength limit of test wire was exceeded and the wire was torn off when it was clamped twice as per the above Embodiment in a tension test. Therefore, only one clamping member is used for a restraint member in comparing the tension tests.

| Details of the tension test | |
|---|---|
| 1. Test mode | single (upward) |
| 2. Speed | 10 mm/min |
| 3. Load cell | 500 kgf |
| 4. F/S Load | 500 kgf |

Figure 3:
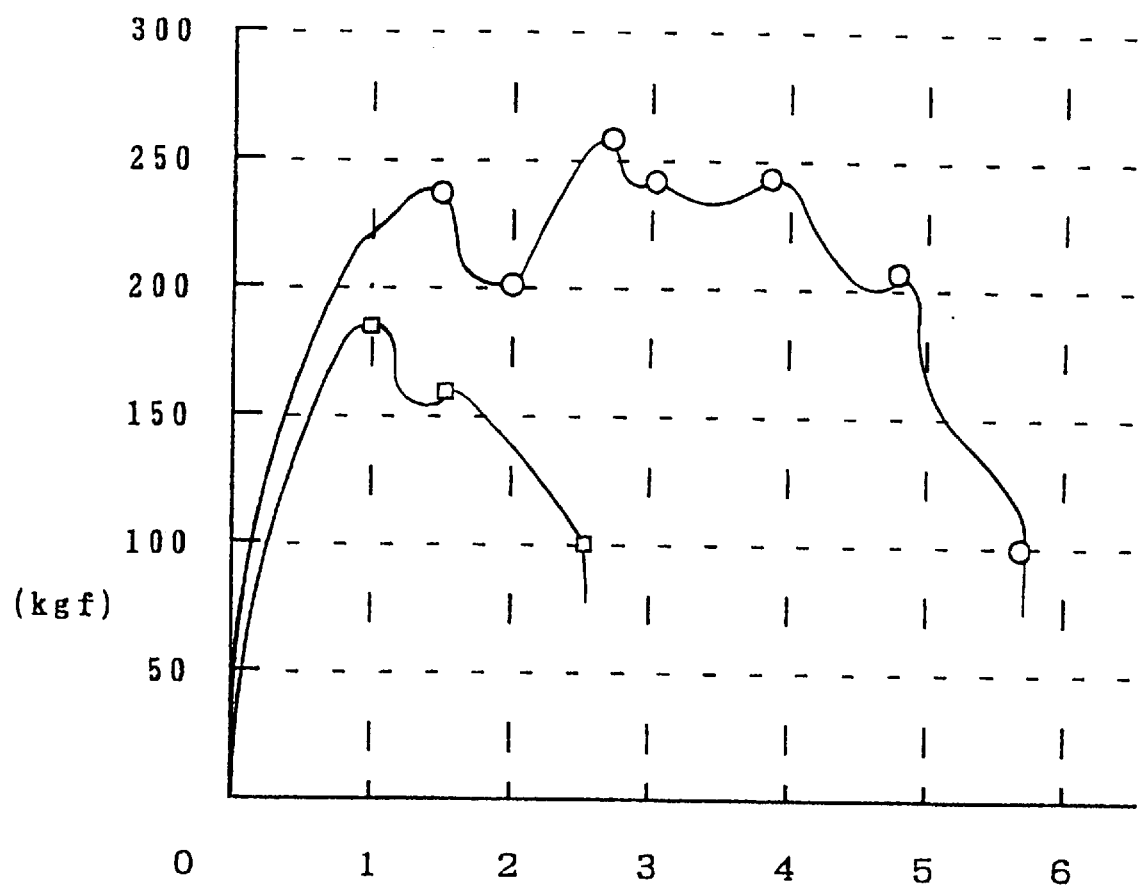
FIG. 3 is a graph which compares restraint forces of restraint means of this embodiment and of prior art.

As shown in FIG. 3, the maximum load of restraint by the restraint member of this Embodiment was half as much again as the maximum load of restraint by only one clamping member. The time up to separation failure was more than doubled.

One optical fiber cable was hauled in the Embodiment. Since restraint metal fitting 40 of the Embodiment has six insertion holes 41, it can haul up to three cables. The advantages of hauling a plurality of cables are the following:

(a) Regarding hauling force, three times as much hauling force for one cable is not required when three cables are being hauled. For instance, even if 100 kgf is required to haul one cable, three cables can be hauled with 200 kgf. Thus, the tension in each cable sharply reduces to 66 Kgf when three cables are hauled. Such reduction of load on the cables effectively prevents the cables from tearing off.

(b) When cables are laid on multiple floors or at several positions of one floor, each cable was respectively laid by prior art. However, in the Embodiment, multiple cables are simultaneously and efficiently hauled. Each cable tip end is cut and connected to desired points individual.

Figure 4:
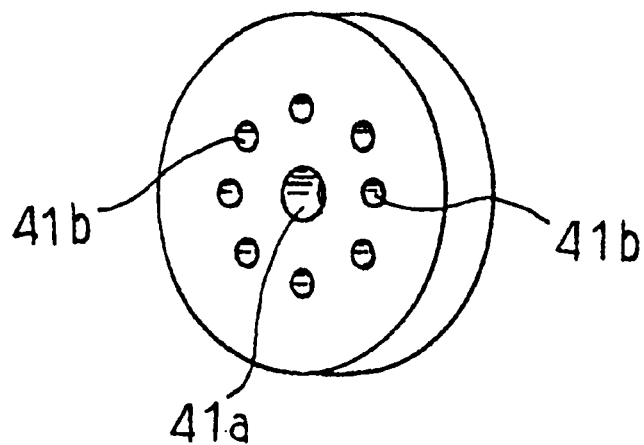
FIG. 4 is a perspective view of another restraint member.

Although restraint metal fitting 40 has six insertion holes, the present invention is not restricted by the Embodiment. For example, as shown in FIG. 4, a main insertion hole 41a and insertion sub-holes 41b around a main insertion hole 41a are provided. The cable, which wires are intertwined, is inserted through the main insertion hole 41a, each wire is untied, and each wire is inserted through insertion sub-holes 41b. The wires are bound and are restrained by the double clampings.

A variety of restraint metal fittings could be applied if it is installed in a container and restrains a cable tip end by double clampings. The number of cables is also selected depending on the type of restraint metal fitting.

Embodiment 2

Figure 5:
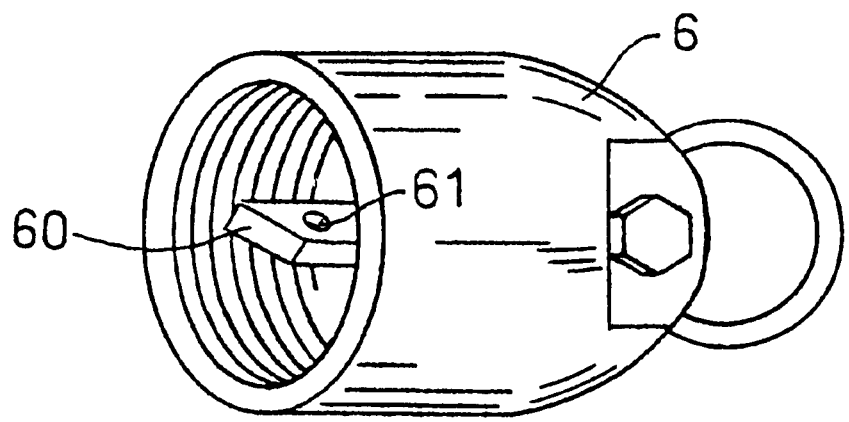
FIG. 5 is a perspective view of the connecting portion of an auxiliary tool for hauling cable of Embodiment 2.

In the auxiliary tool for hauling cable of Embodiment 2, restraint means, which restrains the cable tip end, is provided on a linking portion of the container. As shown in FIG. 5, a linking portion 6 of Embodiment 2 is the same shape as the linking portion 2b of Embodiment 1. A restraint portion 60 is formed as one body on the linking portion 6 to restrain a cable tip end. An insertion hole 61 is bored on the tip of the restraint portion 60.

Embodiment 3

Figure 6:
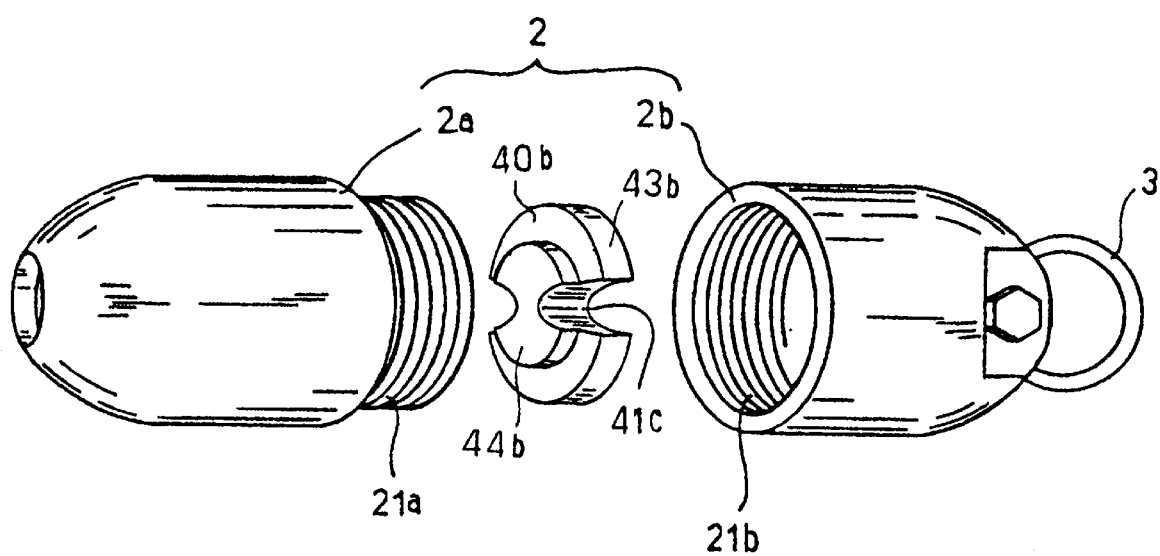
FIG. 6 is an exploded perspective illustration which shows the structure of an auxiliary tool for hauling cable of Embodiment 3.

As shown in FIG. 6, an auxiliary tool for cable hauling of Embodiment 3 uses a restraint metal fitting 40b as a restraint means. The restraint metal fitting 40b has insertion hollows 41c instead of insertion holes of the above Embodiments.

The restraint metal fitting 40b is preferably utilized to restrain the tip end of a cable possessing too thick a diameter to insert into an insertion hole of the above Embodiments. Alternately, Embodiment 3 is preferably used in an auxiliary tool for hauling a cable having a small diameter because insertion holes are impossible to be bored on the restraint metal fitting.

When a cable tip end is restrained by restraint metal fitting 40b, as shown in FIG. 6, a tension member 51 is inserted into the insertion hollows 41c after it is bent back, and then restrained with a clamping member 42a as per Embodiment 1 above.

Figure 7:
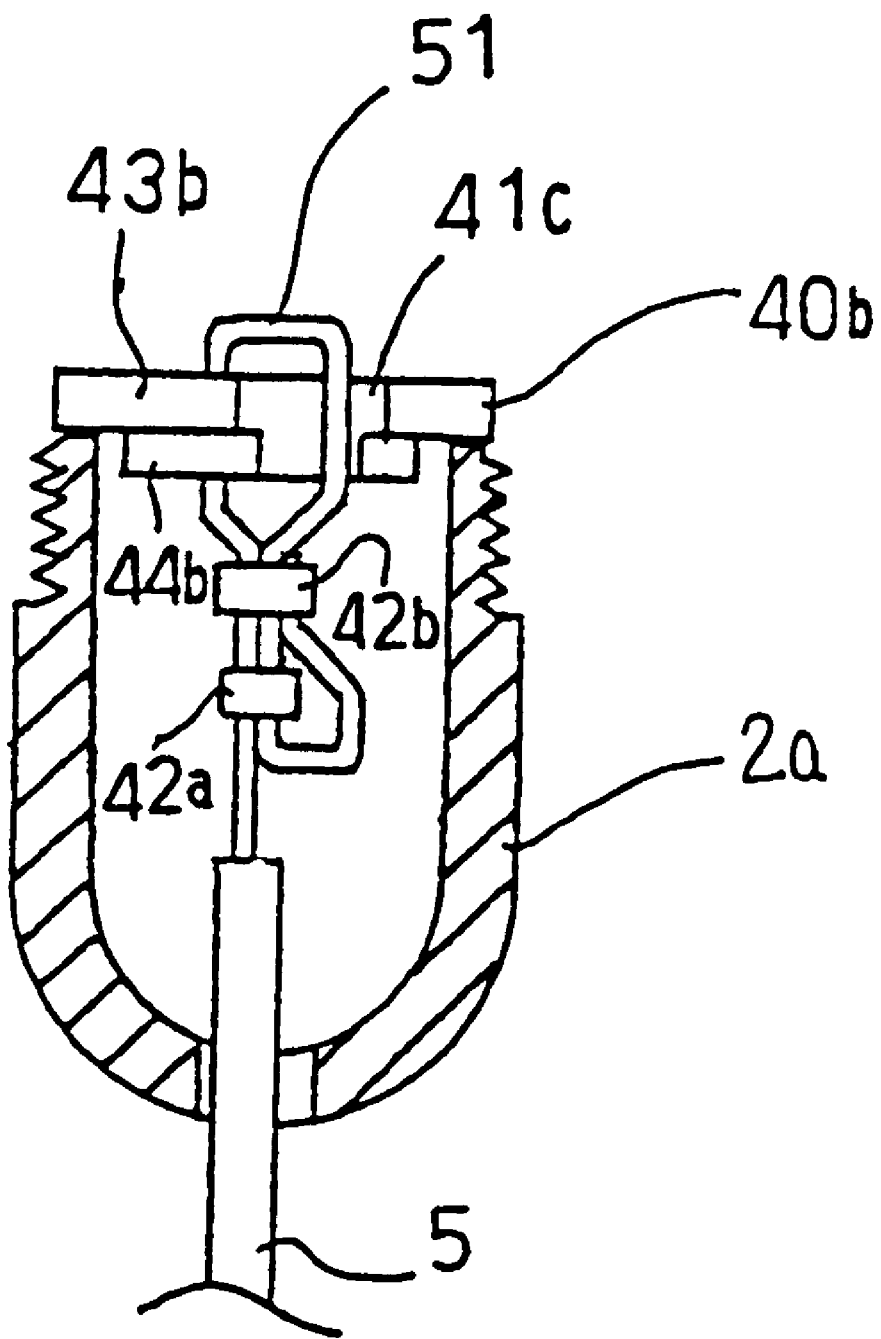
FIG. 7 is a side section which describes a condition of an auxiliary tool for hauling cable connected to the tip end thereof.
Figure 8:
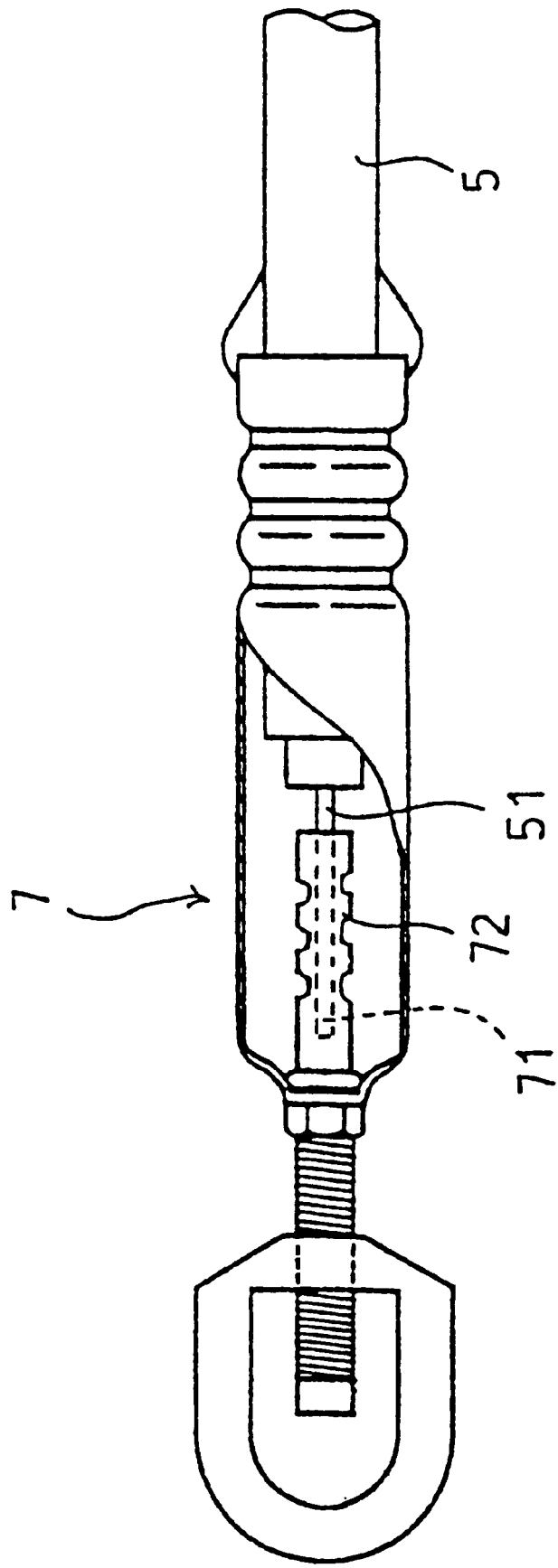
FIG. 8 is a partial cutaway view of connecting toll for hauling cable of a prior art.

Further, this restraint metal fitting 40b has a large diameter portion 43b and a small diameter portion 44b. When a cable tip end is restrained and installed in a container, as shown in FIG. 7, the small diameter portion 44b is contained in the tip end container portion 2a, but the large diameter portion 43b is held on the end of the tip end container portion 2a. The tip end container portion 2a and the linking portion 2b are secured to each other (refer FIG. 2), and then the restraint metal fitting 40b is held in the container 2 so that it is freely rotatable about an axis of the cable tip end.

Therefore, the present invention achieves the following effects:

(1) A cable tip end is easily restrained by using a clamping pliers tool at the laying sight, without specialized equipment.

(2) Since a plurality of cables are capable of being hauled simultaneously, they will be hauled more efficiently and load on the cables will be reduced.

(3) Even in a narrow laying tube, cables can be smoothly hauled because the hauling means of the cable tip end has enough restraint force, and is designed small, which is shorter than the prior art. Particularly, when the cable is turned up from a horizontal tube to a vertical tube, the cable is simply hauled in the corner of tube, without using a switchboard.

(4) Because the restraint metal fitting which restrains the cable is freely rotatable in the container, twisting of the cable is eliminated and breaking off or separation failure by twisting stress is prevented.

Industrial Applicability

An auxiliary tool for cable hauling of this invention is useful to haul communication cables such as an optical fiber cable or other cable such as electrical wires. Particularly, a cable tip end is strongly restrained to link a tip end thereof with a hauling means, and it is contained in a container and is hauled without exposing the cable tip end in the laying tube.

What is claimed is:

1. An auxiliary tool for cable hauling which links a cable tip end with a hauling means to haul a cable for laying comprising:

a container containing said cable tip end;

a linkage linking with said hauling means, said linkage being connected to said container;

a restraint means restraining said cable tip end;

wherein said restraint means is a restraint metal fitting having discoid shape, said restraint metal fitting having a diameter that is slightly smaller than the inner diameter of said container, and further having a plurality of insertion holes bored on said restraint metal fitting, said cable tip end is inserted through one of said plurality of insertion holes, said cable tip end is bent back and is inserted through another of said plurality of insertion holes, whereby said cable tip end is restrained, said restraint metal fitting is contained and held in said container in a manner that said restraint metal fitting is freely rotatable about axis of said cable tip end.

2. An auxiliary tool for cable hauling according to claim 1, wherein said container being divisible into a tip end container portion and a linking portion, said tip end container portion containing an inserted cable tip end, said linking portion being connected to said linkage.

3. An auxiliary tool for cable hauling which links a cable tip end with a hauling means to haul a cable for laying comprising:

a container containing said cable tip end;

a linkage linking with said hauling means, said linkage being connected to said container;

a restraint means restraining said cable tip end;

said container being divisible into a tip end container portion and a linking portion, said tip end container portion containing inserted said cable tip end, said linking portion being connected to said linkage;

wherein said restraint means is a restraint metal fitting having insertion space to insert through said cable tip end, said restraint metal fitting is contained in said container in a manner of being freely rotatable around an axis of said cable tip end, a restraint discoid including a large diameter portion and a small diameter portion, said large diameter portion is formed so as to be held on said tip end container portion, said small diameter portion is formed so as to be contained in said tip end container portion.

4. An auxiliary tool for cable hauling according to claim 2, wherein said restraint means is a restraint member being formed as a part of said linking portion.

* * * * *